US007480239B1

(12) United States Patent
Sundaresan et al.

(10) Patent No.: US 7,480,239 B1
(45) Date of Patent: Jan. 20, 2009

(54) METHOD AND APPARATUS FOR TRUE PRIORITY BASED CONNECTION ESTABLISHMENT WITHIN A PNNI ATM NETWORK

(75) Inventors: Krishna Sundaresan, Sunnyvale, CA (US); Mahesh Chellappa, San Jose, CA (US); Daniel Cauchy, San Jose, CA (US); Chandrasekar Krishnamurthy, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 961 days.

(21) Appl. No.: 09/996,485

(22) Filed: Nov. 27, 2001

(51) Int. Cl.
   *G01R 31/08* (2006.01)
(52) U.S. Cl. .................. 370/230; 370/395.21
(58) Field of Classification Search ........... 370/231, 370/409, 396, 230, 230.1, 235, 395.1, 395.21, 370/395.4
   See application file for complete search history.

(56) References Cited

U.S. PATENT DOCUMENTS

| 4,703,475 A | 10/1987 | Dretzka et al. |
| 4,845,710 A | 7/1989 | Nakamura et al. |
| 4,953,157 A | 8/1990 | Franklin et al. |
| 5,121,383 A | 6/1992 | Golestani |
| 5,128,932 A | 7/1992 | Li |
| 5,140,584 A | 8/1992 | Suzuki |
| 5,153,877 A | 10/1992 | Esaki et al. |
| 5,193,090 A | 3/1993 | Filipiak et al. |
| 5,197,064 A | 3/1993 | Chao |
| 5,208,805 A | 5/1993 | Ochiai |
| 5,222,085 A | 6/1993 | Newman |
| 5,224,099 A | 6/1993 | Corbalis et al. |
| 5,233,606 A | 8/1993 | Pashan et al. |
| 5,274,643 A | 12/1993 | Fisk |
| 5,276,681 A | 1/1994 | Tobagi et al. |
| 5,313,454 A | 5/1994 | Bustini et al. |
| 5,335,224 A | 8/1994 | Cole et al. |

(Continued)

FOREIGN PATENT DOCUMENTS

WO  WO 99/65194 A1  12/1999

OTHER PUBLICATIONS

U.S. Patent Application entitled "Method and Apparatus for Improved Priority Based Connection Establishment Within A PNNI ATM Network", U.S. Appl. No. 10/678,897, filed Oct. 2, 2003, Inventor(s): Ashwin Madhwaraj, et al. (File No.: 081862.P280).

(Continued)

*Primary Examiner*—Firmin Backer
*Assistant Examiner*—Christine Ng
(74) *Attorney, Agent, or Firm*—Blakely, Sokoloff, Taylor & Zafman LLP (57) ABSTRACT

A method is described that involves updating an understanding of an ATM PNNI network after the reception of PTSE information. The PTSE information has SIG information that describes bandwidth which has been allocated to specific priority levels of a bandwidth resource. The bandwidth resource is within the ATM PNNI network. Then, determining a path through the network for a requested connection. The path is determined in light of the updated understanding. The requested connection has a priority level, wherein the path may result in one or more connections being dropped in order to allow bandwidth for the requested connection. Each of the dropped connections has a lower priority level than the priority level of the requested connection.

34 Claims, 9 Drawing Sheets

U.S. PATENT DOCUMENTS

| | | | |
|---|---|---|---|
| 5,341,366 A | 8/1994 | Soumiya et al. | |
| 5,359,592 A | 10/1994 | Corbalis et al. | |
| 5,359,593 A | 10/1994 | Derby et al. | |
| 5,361,259 A | 11/1994 | Hunt et al. | |
| 5,361,372 A | 11/1994 | Rege et al. | |
| 5,367,643 A | 11/1994 | Chang et al. | |
| 5,381,404 A | 1/1995 | Sugano et al. | |
| 5,390,299 A | 2/1995 | Rege et al. | |
| 5,420,857 A | 5/1995 | Jurkevich | |
| 5,422,880 A | 6/1995 | Heitkamp et al. | |
| 5,425,019 A | 6/1995 | Chugo et al. | |
| 5,483,526 A | 1/1996 | Ben-Nun et al. | |
| 5,528,763 A | 6/1996 | Serpanos | |
| 5,539,729 A | 7/1996 | Bodnar | |
| 5,546,389 A | 8/1996 | Wippenbeck et al. | |
| 5,561,663 A | 10/1996 | Klausmeier | |
| 5,602,988 A | 2/1997 | Haulin | |
| 5,613,073 A | 3/1997 | Hammond, Jr. et al. | |
| 5,617,417 A | 4/1997 | Sathe et al. | |
| 5,687,167 A | 11/1997 | Bertin et al. | |
| 5,729,546 A | 3/1998 | Gupta et al. | |
| 5,748,629 A * | 5/1998 | Caldara et al. | 370/389 |
| 5,748,905 A | 5/1998 | Hauser et al. | |
| 5,754,787 A | 5/1998 | Dedrick | |
| 5,764,626 A | 6/1998 | VanDervort | |
| 5,781,533 A | 7/1998 | Manning et al. | |
| 5,790,770 A | 8/1998 | McClure et al. | |
| 5,793,744 A | 8/1998 | Kanerva et al. | |
| 5,815,492 A | 9/1998 | Berthaud et al. | |
| 5,822,540 A | 10/1998 | Caldara et al. | |
| 5,850,395 A | 12/1998 | Hauser et al. | |
| 5,862,137 A | 1/1999 | Manning et al. | |
| 5,867,663 A | 2/1999 | McClure et al. | |
| 5,870,538 A | 2/1999 | Manning et al. | |
| 5,872,769 A | 2/1999 | Caldara et al. | |
| 5,872,771 A | 2/1999 | Park et al. | |
| 5,881,049 A | 3/1999 | Beshai et al. | |
| 5,889,956 A | 3/1999 | Hauser et al. | |
| 5,896,511 A | 4/1999 | Manning et al. | |
| 5,898,671 A | 4/1999 | Hunt et al. | |
| 5,898,691 A | 4/1999 | Liu | |
| 5,905,729 A | 5/1999 | Gaddis et al. | |
| 5,909,427 A | 6/1999 | Manning et al. | |
| 5,917,804 A | 6/1999 | Shah et al. | |
| 5,917,805 A | 6/1999 | Manning et al. | |
| 5,926,475 A | 7/1999 | Saldinger et al. | |
| 5,933,429 A | 8/1999 | Bubenik et al. | |
| 5,936,940 A | 8/1999 | Marin et al. | |
| 5,940,372 A | 8/1999 | Bertin et al. | |
| 5,948,067 A | 9/1999 | Caldara et al. | |
| 5,956,342 A | 9/1999 | Manning et al. | |
| 5,970,067 A | 10/1999 | Sathe et al. | |
| 5,978,359 A | 11/1999 | Caldara et al. | |
| 5,982,771 A | 11/1999 | Caldara et al. | |
| 5,982,776 A | 11/1999 | Manning et al. | |
| 5,983,260 A | 11/1999 | Hauser et al. | |
| 5,983,278 A | 11/1999 | Chong et al. | |
| 5,991,298 A | 11/1999 | Hunt et al. | |
| 5,996,019 A | 11/1999 | Hauser et al. | |
| 6,002,667 A | 12/1999 | Manning et al. | |
| 6,011,778 A | 1/2000 | Kilkki et al. | |
| 6,028,840 A | 2/2000 | Worster | |
| 6,041,039 A | 3/2000 | Kilkki et al. | |
| 6,052,385 A | 4/2000 | Kanerva et al. | |
| 6,061,348 A | 5/2000 | Castrigno et al. | |
| 6,076,112 A | 6/2000 | Hauser et al. | |
| 6,084,858 A | 7/2000 | Matthews et al. | |
| 6,088,736 A | 7/2000 | Manning et al. | |
| 6,088,817 A | 7/2000 | Haulin | |
| 6,115,374 A | 9/2000 | Stonebridge et al. | |
| 6,115,748 A | 9/2000 | Hauser et al. | |
| 6,141,346 A | 10/2000 | Caldara et al. | |
| 6,154,444 A * | 11/2000 | Masuo et al. | 370/225 |
| 6,160,808 A | 12/2000 | Maurya | |
| 6,167,030 A | 12/2000 | Kilkki et al. | |
| 6,167,452 A | 12/2000 | Manning et al. | |
| 6,181,705 B1 | 1/2001 | Branstad et al. | |
| 6,212,582 B1 | 4/2001 | Chong et al. | |
| 6,219,728 B1 | 4/2001 | Yin | |
| 6,222,824 B1 | 4/2001 | Marin et al. | |
| 6,236,655 B1 | 5/2001 | Caldara et al. | |
| 6,240,102 B1 * | 5/2001 | Asano | 370/468 |
| 6,256,309 B1 * | 7/2001 | Daley et al. | 370/395.43 |
| 6,256,674 B1 | 7/2001 | Manning et al. | |
| 6,327,615 B1 | 12/2001 | Kasper | |
| 6,356,546 B1 | 3/2002 | Beshai et al. | |
| 6,356,962 B1 | 3/2002 | Kasper | |
| 6,407,998 B1 | 6/2002 | Polit et al. | |
| 6,418,169 B1 | 7/2002 | Datari | |
| 6,426,957 B1 | 7/2002 | Hauser et al. | |
| 6,466,582 B2 | 10/2002 | Venters et al. | |
| 6,490,249 B1 | 12/2002 | Aboul-Magd et al. | |
| 6,493,317 B1 | 12/2002 | Ma | |
| 6,496,504 B1 | 12/2002 | Malik | |
| 6,512,769 B1 | 1/2003 | Chui et al. | |
| 6,516,371 B1 | 2/2003 | Lai et al. | |
| 6,526,060 B1 | 2/2003 | Hughes et al. | |
| 6,526,063 B1 * | 2/2003 | St-Amand et al. | 370/395.5 |
| 6,526,451 B2 | 2/2003 | Kasper | |
| 6,529,498 B1 * | 3/2003 | Cheng | 370/351 |
| 6,539,024 B1 | 3/2003 | Janoska et al. | |
| 6,546,249 B1 | 4/2003 | Imai et al. | |
| 6,603,764 B1 * | 8/2003 | Epley | 370/395.1 |
| 6,608,813 B1 | 8/2003 | Chiussi et al. | |
| 6,608,815 B1 | 8/2003 | Huang et al. | |
| 6,614,757 B1 * | 9/2003 | Rochberger et al. | 370/231 |
| 6,625,155 B1 | 9/2003 | Dziong | |
| 6,658,014 B1 | 12/2003 | Tezuka | |
| 6,678,264 B1 | 1/2004 | Gibson | |
| 6,687,230 B1 * | 2/2004 | Furutono et al. | 370/238 |
| 6,690,671 B1 | 2/2004 | Anbiah et al. | |
| 6,724,881 B1 | 4/2004 | McAllister et al. | |
| 6,731,599 B1 | 5/2004 | Hunter et al. | |
| 6,747,972 B1 | 6/2004 | Lenoski et al. | |
| 6,751,214 B1 * | 6/2004 | Parruck et al. | 370/352 |
| 6,778,495 B1 | 8/2004 | Blair | |
| 6,819,658 B1 | 11/2004 | Agarwal et al. | |
| 6,826,196 B1 | 11/2004 | Lawrence | |
| 6,862,284 B1 | 3/2005 | Spiegel et al. | |
| 6,876,657 B1 | 4/2005 | Brewer et al. | |
| 6,891,836 B1 | 5/2005 | Chen et al. | |
| 6,895,441 B1 * | 5/2005 | Shabtay et al. | 709/238 |
| 6,934,249 B1 | 8/2005 | Bertin et al. | |
| 6,956,821 B2 * | 10/2005 | Szviatovszki et al. | 370/237 |
| 6,977,898 B1 | 12/2005 | Miriyala | |
| 7,016,975 B2 * | 3/2006 | Dolganow et al. | 709/242 |
| 7,039,014 B1 | 5/2006 | Krishnamurthy et al. | |
| 7,092,356 B2 * | 8/2006 | Rabie et al. | 370/230 |
| 7,233,571 B1 | 6/2007 | Krishnamurthy et al. | |
| 2001/0043624 A1 * | 11/2001 | Saito et al. | 370/524 |
| 2002/0018269 A1 | 2/2002 | Chaudhuri et al. | |
| 2002/0023163 A1 * | 2/2002 | Frelechoux et al. | 709/230 |
| 2002/0057649 A1 | 5/2002 | Kinnunen | |
| 2002/0124106 A1 * | 9/2002 | Dolganow et al. | 709/242 |
| 2003/0236854 A1 | 12/2003 | Rom et al. | |
| 2004/0213242 A1 * | 10/2004 | Ando et al. | 370/395.1 |
| 2005/0207371 A1 | 9/2005 | Chen et al. | |

OTHER PUBLICATIONS

U.S. Patent Application entitled "Method and System for Prioritized Resource Allocation in a Network Switch", U.S. Appl. No. 09/630,338, filed Jul. 31, 2000, Inventor(s): Hugh Barrass, et al., (File No.: 081862.P177).

U.S. Patent Application entitled "Connection-Based Bandwidth Utilization", U.S. Appl. No. 10/025,265, filed Dec. 18, 2001, Inventor(s): Chandrasekar Krishnamurthy, et al. (File No.: 081862.P253).

Olieveira, et al., "A New Preemption Policies for DiffServ-Aware Traffic Engineering to Minimize Rerouting," Proceeding of IEEE INFOCOM 2002, New York, pp. 695-704.

"RADCOM Network Simulators and Analyzers," http://www.radcom.com/Products.aspx?boneld=660&pageCTemplate=0&print=2, 1 page (based on product prior to Dec. 18, 2001).

"RADCOM Protocol Simulators/PNNI Simulator," http://www.radcom.com/Products.aspx?boneld=936&PageCTemplate=0&print=2, 2 pgs. (based on product prior to Dec. 18, 2001).

"Soft-ATM Private Network-to-Network Interface (PNNI)," http://www.ikon-gmbh.de/german/datasheets/netplane/pnni.htm (Jul. 12, 2001).

"PNNI: A little background," http://www.antc.utwente.nl/Reports/ATM/PNNI/pnni_background.html (Sep. 19, 2001).

"Protocol Directory - ATM Signaling & Routing," http://www.protocols.com/pbook/armsig.htm (Nov. 14, 2001).

International Telecommunications Union (ITU), ITU-T, Q.2931. B-ISDN Application Protocols for Access Signaling (Feb. 1995).

The ATM Forum Technical Committee, "Addressing Addendum to ATM User-Network Interface (UNI) Signalling Specification, Version 4.0," ATM Forum document No. AF-CS-0107.000, Feb. 1999.

The ATM Forum Technical Committee, "UNI Signaling 4.0 Security Addendum," ATM Forum document No. AF-CS-0117.000, May 1999.

The ATM Forum Technical Committee, "Modification of Traffic Parameters for an Active Connection Signalling Specification (PNNI, AINI, and UNI), version 2.0," ATM Forum document No. AF-CS-0148.001, May 2001.

The ATM Forum Technical Committee, "ATM User-Network Interface (UNI) Signalling Specification, Version 4.0," ATM Forum document No. af-sig-0061.000, Jul. 1996.

"Enhanced Frame Solutions Miltilink Frame," White Paper, Lucent Technologies, Inc. (Jul. 2001).

"End-to-End Multiink Frame Replay Implementation Agreement," FRF.15, Frame Relay Forum Technical Committee (Aug. 1999).

"Multiink Frame Replay UNI/NNI Implementation Agreement," FRF.16, Frame Relay Forum Technical Committee (Aug. 1999).

"Priority Queuing Strategies and Buffer Allocation Protocols for Traffic Control at an ATM Integrated Broadband Switching System", A Lin et al., IEEE Journal on Selected Areas in Communications, vol. 9, No. 9, Dec. 1991, pp. 1524-1536.

"Comparative Performance Study of Space Priority Mechanisms for ATM Network", H. Kröner, Proceedings IEEE Infocom '90, The Conference and Communications Societies, Los Alamitos, CA, Jun. 3-7, 1990, pp. 1136-1143.

"Dimensioning of an ATM switch with shared buffer and threshold priority", J.F. Meyer, et al., Computer Networks and ISDN Systems, vol. 26, No. 1, 1993, pp. 95-108.

Saltouros, Marios P., et al., "A Scalable Qos-Based Scheme for ATM Networks Using Reinforcement Learning Algorithms," University of Athens, Greece (1999).

* cited by examiner

| BANDWIDTH RESOURCE $103_3$ |
|---|
| TOTAL: 466.5 Mb/s |
| PRIORITY 1: 155.5 Mb/s |
| PRIORITY 2: 155.5 Mb/s |
| PRIORITY 3: 0 |
| ... |
| PRIORITY n: 0 Mb/s |

| BANDWIDTH RESOURCE $103_{11}$ |
|---|
| TOTAL: 466.5 Mb/s |
| PRIORITY 1: 155.5 Mb/s |
| PRIORITY 2: 155.5 Mb/s |
| PRIORITY 3: 155.5 Mb/s |
| ... |
| PRIORITY n: 0 Mb/s |

| BANDWIDTH RESOURCE $103_{14}$ |
|---|
| TOTAL: 155.5 Mb/s |
| PRIORITY 4: 51 Mb/s |
| PRIORITY 5: 51 Mb/s |
| PRIORITY 6: 51 Mb/s |
| ... |
| PRIORITY n: 0 Mb/s |

| BANDWIDTH RESOURCE $103_2$ |
|---|
| TOTAL: 466.5 Mb/s |
| PRIORITY 4: 155.5 Mb/s |
| PRIORITY 5: 155.5 Mb/s |
| PRIORITY 6: 155.5 Mb/s |
| ... |
| PRIORITY n: 0 Mb/s |

| BANDWIDTH RESOURCE $103_5$ |
|---|
| TOTAL: 466.5 Mb/s |
| PRIORITY 4: 155.5 Mb/s |
| PRIORITY 5: 155.5 Mb/s |
| PRIORITY 6: 155.5 Mb/s |
| ... |
| PRIORITY n: 0 Mb/s |

| BANDWIDTH RESOURCE $103_{12}$ |
|---|
| TOTAL: 466.5 Mb/s |
| PRIORITY 4: 155.5 Mb/s |
| PRIORITY 5: 155.5 Mb/s |
| PRIORITY 6: 155.5 Mb/s |
| ... |
| PRIORITY n: 0 Mb/s |

METHOD AND APPARATUS FOR TRUE PRIORITY BASED CONNECTION ESTABLISHMENT WITHIN A PNNI ATM NETWORK

FIELD OF THE INVENTION

The field of invention relates to networking, generally; and, more specifically, to a method and apparatus for true priority based connection establishment within a PNNI ATM network.

BACKGROUND

Figure 1:
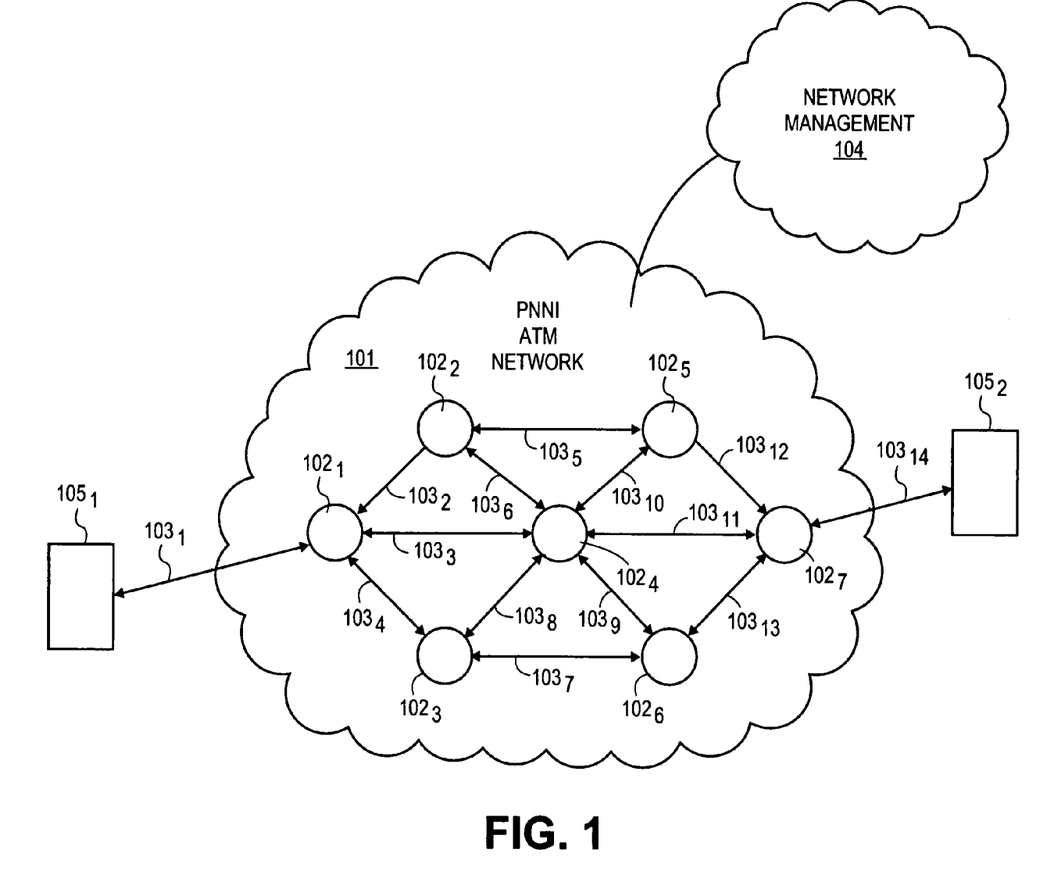
FIG. 1 shows an embodiment of a PNNI ATM network.

An exemplary Private Network Node Interface (PNNI) Asynchronous Transfer Mode (ATM) network 101 is shown in FIG. 1. ATM is a networking technology that transports information with "cells" of data. As such, if a significantly sized body of information (e.g., a document or file) is to be transported across an ATM network, the body of information is effectively "broken down" into a plurality of cells. The plurality of cells are then individually sent across the network and reassembled at the receiving end in order to reconstruct the original body of information.

The term "connection" or "circuit" is often used to describe a pre-defined path through a network. Typically, when a body of information is to be transported over a network, a connection is setup beforehand that establishes (in some manner and to some extent) the path that the cells will take. Various types of connections may be used within an ATM network 101. These include: 1) permanent virtual circuits (PVCs); 2) switched virtual circuits (SVCs); and 3) soft permanent virtual circuits (SPVCs).

In the case of PVCs, a quasi-permanent connection is established (e.g., a connection that lasts for days, weeks, months, etc.). PVCs are often used in situations where a large corporate user desires to permanently clear a guaranteed pipe through the network 101 from one large office to another large office. For example, if node $105_1$ corresponds to the Customer Premise Equipment (CPE) of a first corporate office and node $105_2$ corresponds to the CPE of a second corporate office, a PVC may be established that couples nodes $102_1$, $102_4$, $102_7$ and network lines $103_3$, $103_{11}$ together (in order to form an end-to-end path through the network 100 between CPEs $105_1$ and $105_2$).

Generally, the amount of traffic (e.g., as between two large corporate offices) and the extent of the usage (e.g., every business day for the foreseeable future) justifies the costs associated with dedicating, in a quasi-permanent fashion, a fixed amount of the network's resources to one particular pathway. Typically, a PVC is manually configured by a network manager from a network management control station 104. As such, commands are issued from the network control station 104 to the various nodes in the network 101 that "make up" the PVC (so that the lookup tables, etc. within these nodes can be properly updated).

Another characteristic of a PVC is that a PVC user simply directs traffic into the network 101 (e.g., from node $105_1$) with little or no formal request for transportation services from the network 101. For example, typically, a PVC user at node $105_1$ will send ATM cells having the PVC's VPI/VCI across the ATM User Network Interface (UNI) at link $103_1$. Based upon the VPI/VCI information, node $102_1$ (e.g., as well as subsequent nodes along the PVC path) will be able to properly switch the cells onto a link that corresponds to the PVC path. Thus, because the connection is quasi-permanent and has already been established, there is little or no procedural overhead associated with connection setup (such as a SETUP request message and the like). The user is provided an appropriate VPI/VCI well beforehand (e.g., shortly after PVC setup) which is invoked each time thereafter by the user when the services of the PVC are desired.

SVCs, on the other hand, are established on a temporary basis rather than a quasi-permanent basis. SVCs efficiently utilize the resources of a network if the network has to support a large number of different connection paths over a fairly brief period of time (e.g., seconds, minutes, hours). In contrast to PVCs, SVCs are usually established on a "call-by-call" basis and therefore have: 1) some form of formal user request to the network 101 for transportation services; and, 2) a connection "setup" procedure that follows the request for transportation services and a connection "tear down" procedure that follows the successful performance of the requested transportation services.

The connection setup/tear down procedures may be viewed as the "automatic" configuration of a connection within the network rather than manual configuration from a network management control station 104. PNNI is a routing and signaling protocol that determines and establishes connection paths. The PNNI routing protocol is executed on the source endpoint (e.g., source endpoint $102_1$ for connections initiated from originating node $105_1$), and is often referred to as a "source" routing protocol. An example of PNNI's routing and signaling techniques are provided immediately below.

If node $105_1$ (the "originating" node) desires to send information to node $105_2$ (the "target" node), the originating node $105_1$ will effectively request the network 101 for a connection to be established between nodes $105_1$ and node $105_2$. Typically, this request takes the form of a SETUP message that is passed over the ATM UNI at link $103_1$. The access node $102_1$ (which may be referred to as the source endpoint node) receives the SETUP message and determines an appropriate path for the connection through the network via the PNNI routing protocol.

The SETUP message then traverses the network 101 to the destination endpoint node $102_7$. When the SETUP message is received at the destination endpoint node $102_7$, a CONNECT message is issued from the destination endpoint node $102_7$ to the source endpoint node $102_1$. The CONNECT message "bounces", node-by-node, along the connection path to the source endpoint node $102_1$. Each node that receives the CONNECT message updates its lookup table (or other routing/switching platform) with an appropriate reference to the connection being established. When the source endpoint node $102_1$ receives the CONNECT message, the VPI/VCI for the connection is passed to the user at the ATM UNI (along link $103_1$), the connection is established, and transportation services may commence. After the transportation services are complete, the connection is torndown in a manner similar to that in which it was established.

An SPVC is often viewed as a blending of an SVC and a PVC. SPVCs are often used to provide guaranteed bandwidth to a particular user (such that the user enjoys service as if a permanent pipe has been established through the network 101) while, simultaneously, the network 101 is allowed to flexibly adapt to different connection paths over brief periods of time (by establishing each SPVC communication with connection setup and tear down procedures). In order to implement an SPVC service, the endpoint nodes of the ATM network 101 (e.g., source node $102_1$ and destination node $102_7$) are configured to behave like PVC nodes with respect to the user (e.g., along the ATM UNI at link $103_1$) while behaving like SVC nodes within the ATM network 101 itself.

With an SPVC, the source and destination endpoint nodes $102_1$ and $102_7$ are usually manually configured by the network management station 104 to provide a PVC interface to the users at node $105_1$ (and at node $105_2$). That is, for example, a quasi permanent VPI/VCI is provided to the user that is to be invoked each time the services of the SPVC are desired. Upon the receipt of ATM cells having this VPI/VCI information, however, the endpoint source node $102_1$ triggers the release of a SETUP message which traverses the network 101 to destination endpoint node $102_7$. A CONNECT message is returned to the endpoint source node $102_1$, and the SPVC is established.

FIGURES

The present invention is illustrated by way of example, and not limitation, in the Figures of the accompanying drawings in which.

DESCRIPTION

A problem with both SVC and SPVC type connections is that the connection establishment process does not execute a "true" Quality of Service (QoS) priority bumping scheme with respect to the network 101 as a whole. QoS relates to the notion that the various connections supported by the network 101 are to be prioritized in some manner with respect to one another. For example, the network 101 may be configured to give cells associated with higher priority connections lower end-to-end delay across the network 101 than cells associated with lower priority connections.

Another QoS parameter concerns the connection establishment process. Specifically, under a process that may be referred to as "priority bumping", higher priority connections are established at the expense of lower priority connections. For example, if the network 101 is supporting a large number of low priority connections at the same moment it happens to receive a request for a high priority connection, one or more of the low priority connections can be "dropped" so that the high priority connection can be established.

The PNNI routing and signaling scheme is often said to be a "source routing" scheme because the appropriate path for a network connection is determined at the node that acts as its source endpoint (e.g., node $102_1$ for connections initiated by node $105_1$). Currently, only a limited form of priority bumping is possible. Specifically, only those lower priority connections that actually pass through the source endpoint can be dropped.

Consequently, a remote node that supports many low priority connections cannot drop these connections in order to support a higher priority connection; unless, these connections also happen to flow through the same endpoint node that seeks to establish the high priority connection. Thus, in a sense, the power to drop one or more lower priority connections in favor of a higher priority connection is localized to the realm of the source endpoint node that seeks to establish the higher priority connection (rather than being distributed over the network 101 as a whole).

The power to drop connections is limited in the manner described above because the source endpoint node that is responsible for establishing a connection has little or no perspective as to the manner in which bandwidth resources elsewhere in the network have been allocated with respect to connection priority. As such, in order to expand the scope of those lower priority connections that may be dropped in order to support a higher priority connection, a source endpoint should be made aware of the connections being supported on other nodes in terms of their priority and they bandwidth the consume.

Figure 2:
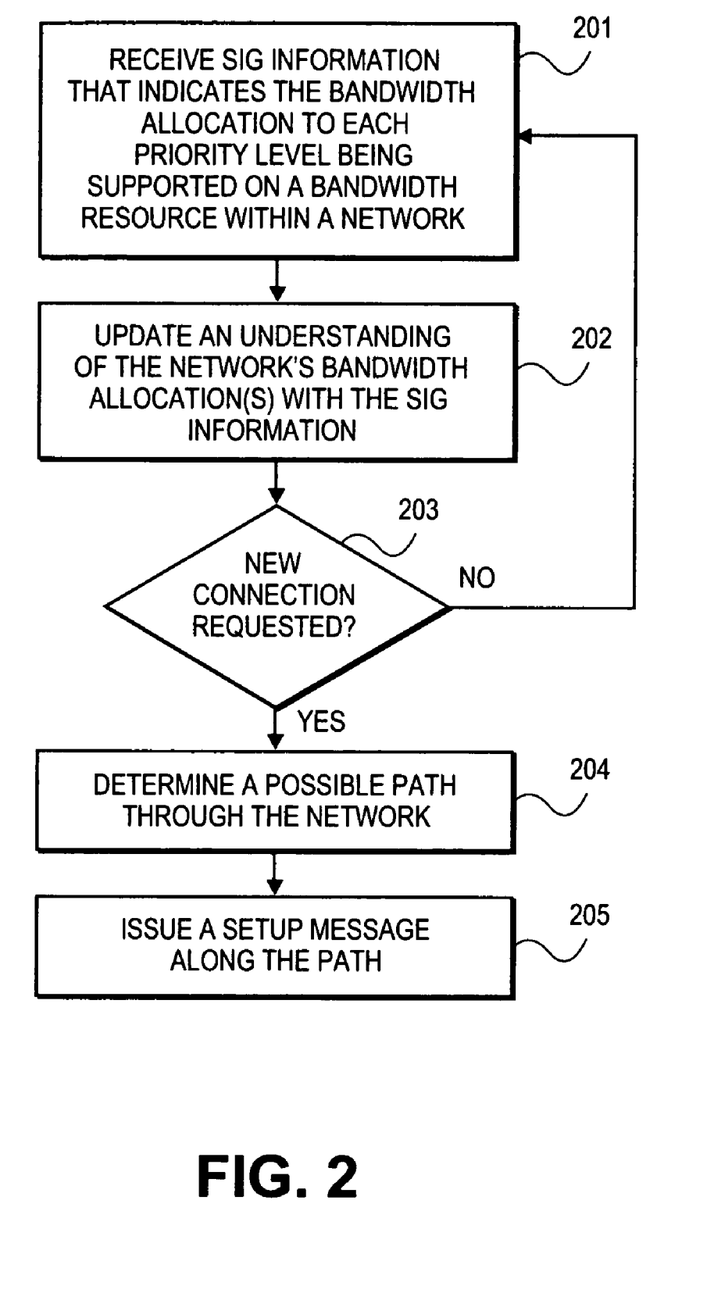
FIG. 2 shows an embodiment of a methodology for true priority based connection establishment within a PNNI ATM network.

FIG. 2 shows an embodiment of a methodology that accomplishes this task. According to the approach described by the methodology of FIG. 2, the nodes within an ATM network "broadcast" to one another the bandwidth they have allocated (e.g., in the form of active connections) to each priority level. As such, a source endpoint can develop a full perspective as to the manner in which bandwidth is being allocated, per priority level, and decide in light of this perspective whether or not the network as a whole can support a newly requested connection.

Thus, as seen in the methodology of FIG. 2, a prospective source endpoint node will receive 201 System capabilities Information Group (SIG) information (from the other nodes within the PNNI network in which it resides) that describe how the bandwidth resources (e.g., links, nodes, a portion thereof or a combination thereof) have been allocated with respect to the priority of the connections within the network. SIG information, as described in more detail further below, is a mechanism that has been established by the PNNI scheme for the passing of information that has not been formally provided for by the PNNI standard.

After the SIG information has been received 201, the prospective source endpoint node will update 202 its present understanding of the network. In various embodiments, the understanding of the network corresponds to the collection of the latest SIG information received from each node within the network. As such, a network wide status is crafted from which those bandwidth resources (e.g., a remote node; and/or, a link or portion of a link that is coupled to a remote node) that can be used to support a connection having a specific priority is identified.

When a new connection is requested 203 (e.g., formally in the case of an SVC or informally in the case of an SPVC), the prospective source node attempts to determine 204 a possible path through the network. For example, in various "path-recursive" approaches, the prospective source endpoint node is configured to determine a "first pass" path (e.g., according to a PNNI compliant source routing algorithm) through the network. Then, once the "first pass" path has been determined, the bandwidth resources that would be used along the path are looked into (as understood via the network understanding that has been developed 202) to see if the path can be entertained.

If the path can be entertained, the connection path is established (which may involve the dropping of lower priority connections) via the issuance 205 of a SETUP message from the source endpoint node. If not, an alternative "second pass" path is determined and analyzed in a similar fashion. The process continues in a recursive fashion until a workable path is identified (in which case the connection is ultimately established); or, alternatively, is not identified (in which case the connection is not ultimately established).

In other approaches, unlike the approach just described above where different paths are analyzed recursively, a routing algorithm may be used that automatically determines the appropriate path. For example, a weighted routing algorithm may be used that assigns weights to the bandwidth resources of the network that are available for the priority level of the requested connection. The mathematics of the algorithm then automatically finds the path having the heaviest (or lightest) weight as it progresses systematically from the source endpoint node to the destination endpoint node. Other routing approaches may be possible as well.

Figure 3:
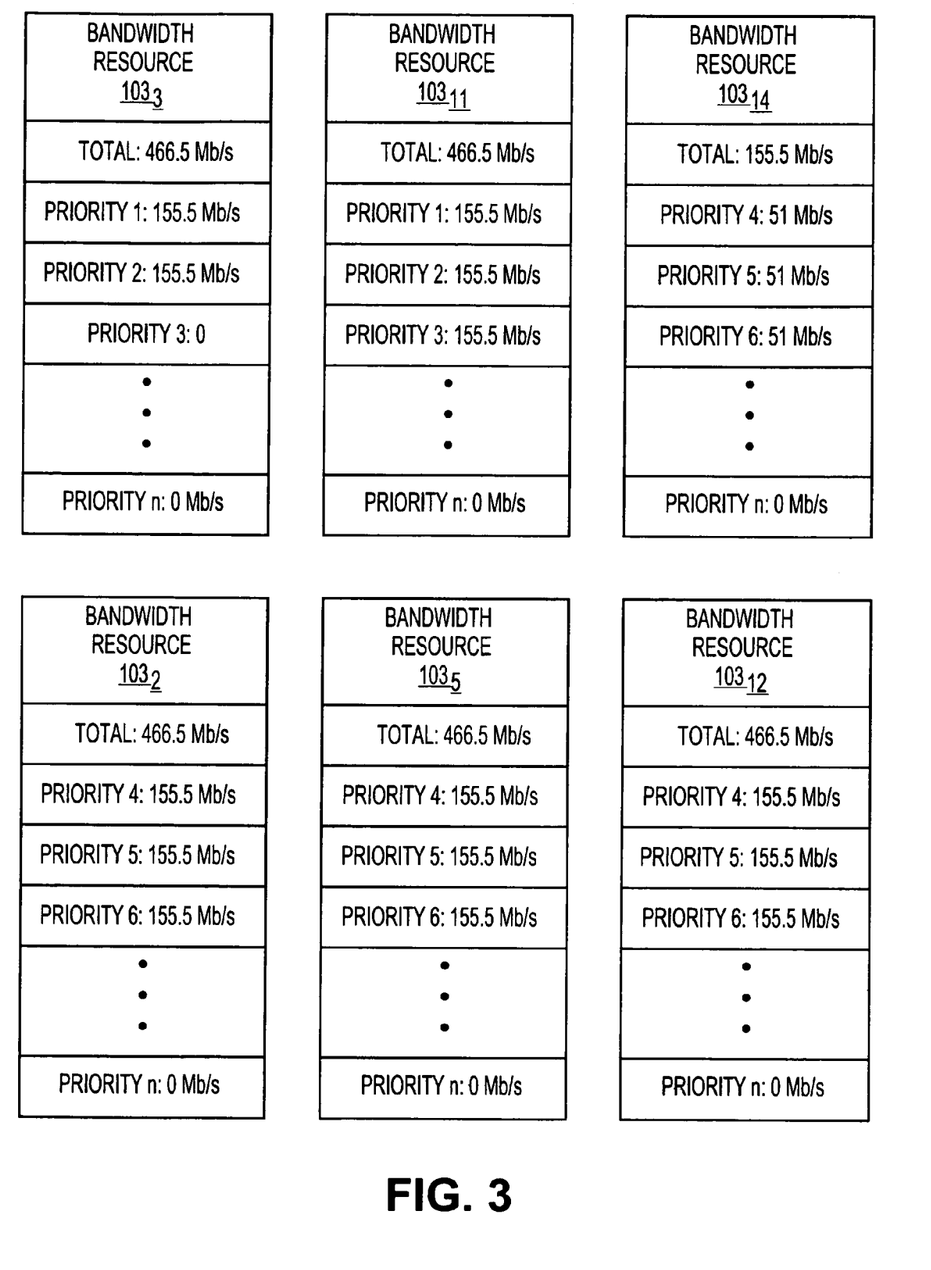
FIG. 3 shows an example of a PNNI ATM network's bandwidth resource allocation prior to the establishment of a new connection.
Figure 4:
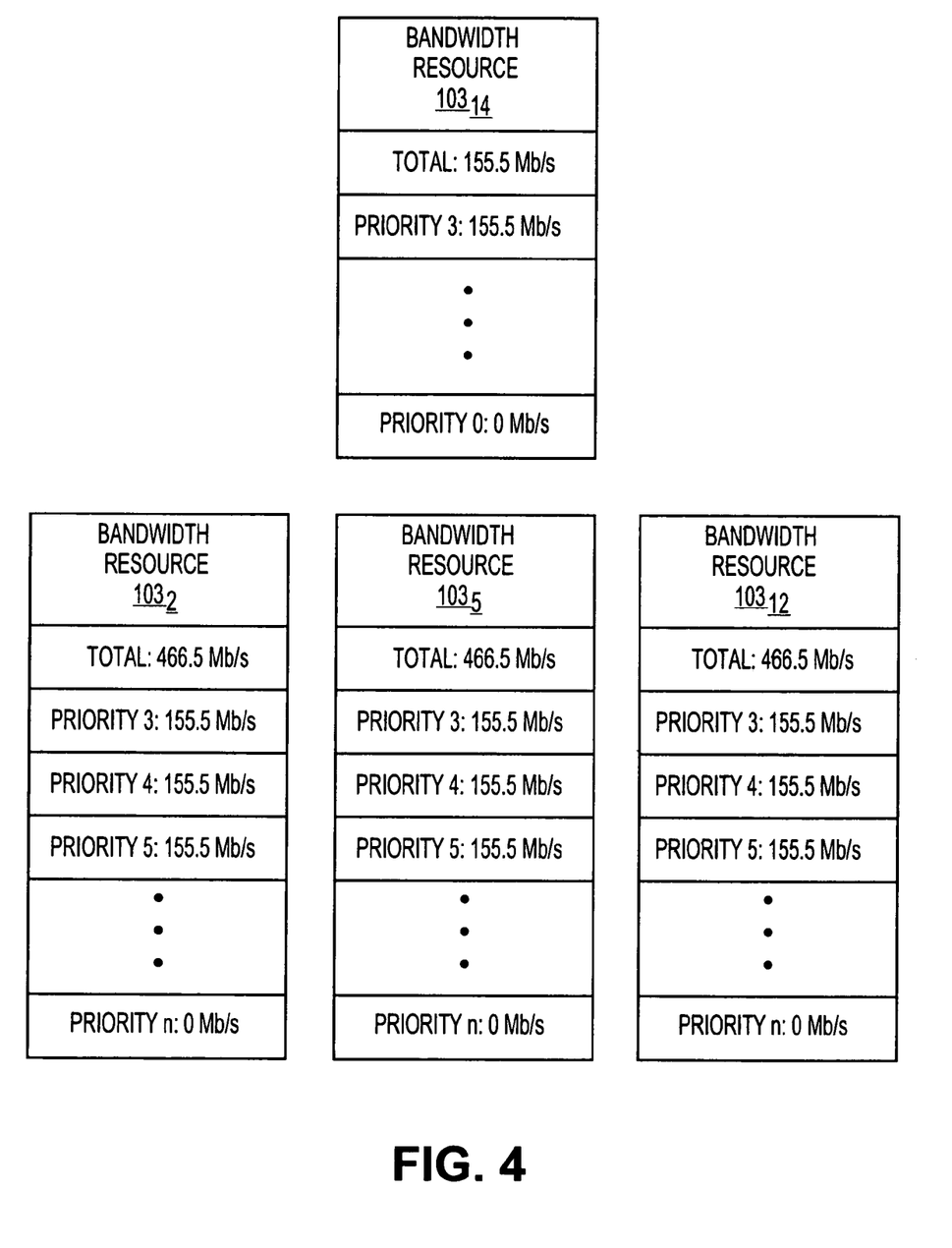
FIG. 4 shows an example of a PNNI ATM network's bandwidth resource allocation after the new connection referred to with respect to FIG. 3 is established.

FIGS. 3 and 4 demonstrate an embodiment of the organization and/or presentation of the SIG information that is broadcast around the network 101 of FIG. 1. As the SIG information is broadcast within the network 101, it will eventually be collected by a prospective source endpoint such as node $102_1$. The discussion pertaining to FIGS. 3 and 4 relate to a path recursive source routing technique. However, it is important to point out that the organization and presentation of the SIG information as depicted in FIGS. 3 and 4 can be used for other routing techniques as well (e.g., such as the weighted technique alluded to just above).

FIG. 3 shows a portion of an exemplary understanding that has been developed for network 101 of FIG. 1 by prospective source endpoint $102_1$. As described above, an understanding of a network may be crafted by collecting the latest SIG information units that have been broadcast within the network for various bandwidth resources. A bandwidth resource is a network element that transports traffic such as a node or link or portion thereof or combination thereof. The SIG information units that are shown in FIGS. 3 and 4 depict bandwidth allocations, on a per priority level basis, for some of the links within network 101 of FIG. 1.

Specifically, FIG. 3 shows exemplary SIG information units that have been broadcast for links $103_2$, $103_3$, $103_5$, $103_{11}$, $103_{12}$, and $103_{14}$ of FIG. 1. As a brief aside, note that only link bandwidth information is observed in FIG. 3 rather than nodal bandwidth. Generally, the particular bandwidth resources that are described by the SIG information units will depend upon the needs of the particular routing technique. That is, various routing techniques may use only link related bandwidth information whereas various other routing algorithm techniques may use only nodal related bandwidth information. Further still, alternate routing algorithm techniques may use some combination of nodal and link related bandwidth information.

With regard to the discussion of FIGS. 3 and 4, however, one may assume that the applicable routing technique uses only link bandwidth information. In the exemplary embodiment of FIGS. 3 and 4, there are "n" priority levels. Thus, as seen in FIGS. 3 and 4, each SIG information unit includes a "total" bandwidth description (that describes the total bandwidth of the link being described), as well as n priority level bandwidth descriptions (that each describe the bandwidth allocated to the corresponding priority level).

Referring to FIGS. 1 and 3, consider an example in which user node $105_1$ requests endpoint node $102_1$ to establish a 155.5 Mb/s, level 3 priority SVC or SPVC connection to user node $105_2$ (through endpoint node $102_7$). As such, endpoint node $102_1$ acts as the source endpoint node for the requested connection. Assuming that the path-recursive routing protocol being executed on the source endpoint node $102_1$ identifies the $102_1$-$103_3$-$102_4$-$103_{11}$-$102_7$ path through the network 101 as the "first pass" path, note that the SIG information for links $103_3$ and $103_{11}$ illustrate that link $103_3$ can entertain the requested connection but that link $103_{11}$ cannot.

That is, the SIG information unit for link $103_3$ indicates that 311 Mb/s of that link's bandwidth has been allocated for connections having a priority level of 1 or a priority level of 2 (i.e., 155.5 Mb/s of priority level 1 traffic+155.5 Mb/s of priority level 2 traffic=311 Mb/s of priority level 1 and 2 traffic). Because the requested connection has a priority level of 3 (and because higher priority connections have lower priority level numbers), the 311 Mb/s worth of allocated bandwidth will not be dropped from link $103_3$ (because this bandwidth has been dedicated to higher priority connections) and may be said to be "unavailable".

Nevertheless, 155.5 Mb/s of the link's bandwidth is freely available (i.e., 466.5 Mb/s of total bandwidth−311 Mb/s of unavailable bandwidth=155.5 Mb/s of available bandwidth). As such, link $103_3$ can be used to support the requested connection. Link $103_{11}$, however, has no bandwidth available for links of priority level 3 or lower. To first order, all 466.5 Mb/s of the link's bandwidth has been consumed; and, none of the priority levels for which bandwidth has been allocated is lower than the priority level of the requested connection. As such, there are no lower priority connections that can be "bumped" in order to make room for the requested connection. Link $103_3$ is therefore deemed unavailable for the connection and the "first pass" path through the network 101 can not be established.

If the routing protocol identifies a $103_2$-$102_2$-$103_5$-$102_5$-$103_{12}$-$102_7$ path through the network as the "second pass" path, this second pass path can be entertained. Specifically, each of links $103_2$, $103_5$, and $103_{12}$ are only carrying traffic having a lower priority (priority levels 4, 5 and 6) than the requested connection (priority). As such, in an embodiment, any or all of the connections on these links may be dropped to support connections having a priority level of 3 or higher.

In a further embodiment, connections are dropped according to reverse priority. That is, the lowest priority connection(s) beneath the priority level of the requested connection are dropped first, followed by the next lowest, etc. FIG. 4 shows a depiction of the broadcast SIG information after the requested connection is established on the $103_2$-$102_2$-$103_5$-$102_5$-$103_{12}$-$102_7$ network path. Note that, consistent with the reverse priority bumping scheme, the priority level 3 connection that was just requested has been established at the expense of the priority level 6 connection(s) (that were shown in FIG. 3).

That is, the 155.5 Mb/s worth of bandwidth that was originally allocated to the priority level 6 connection(s) has been re-allocated to the newly established priority level 3 connection. As a result, the priority level 4 and priority level 5 connection(s) have been unaffected by the establishment of the new, priority level 3 connection. Note that the newly established priority level 3 connection has also dropped all of the previous traffic that existed on access link $103_{14}$.

Figure 5:
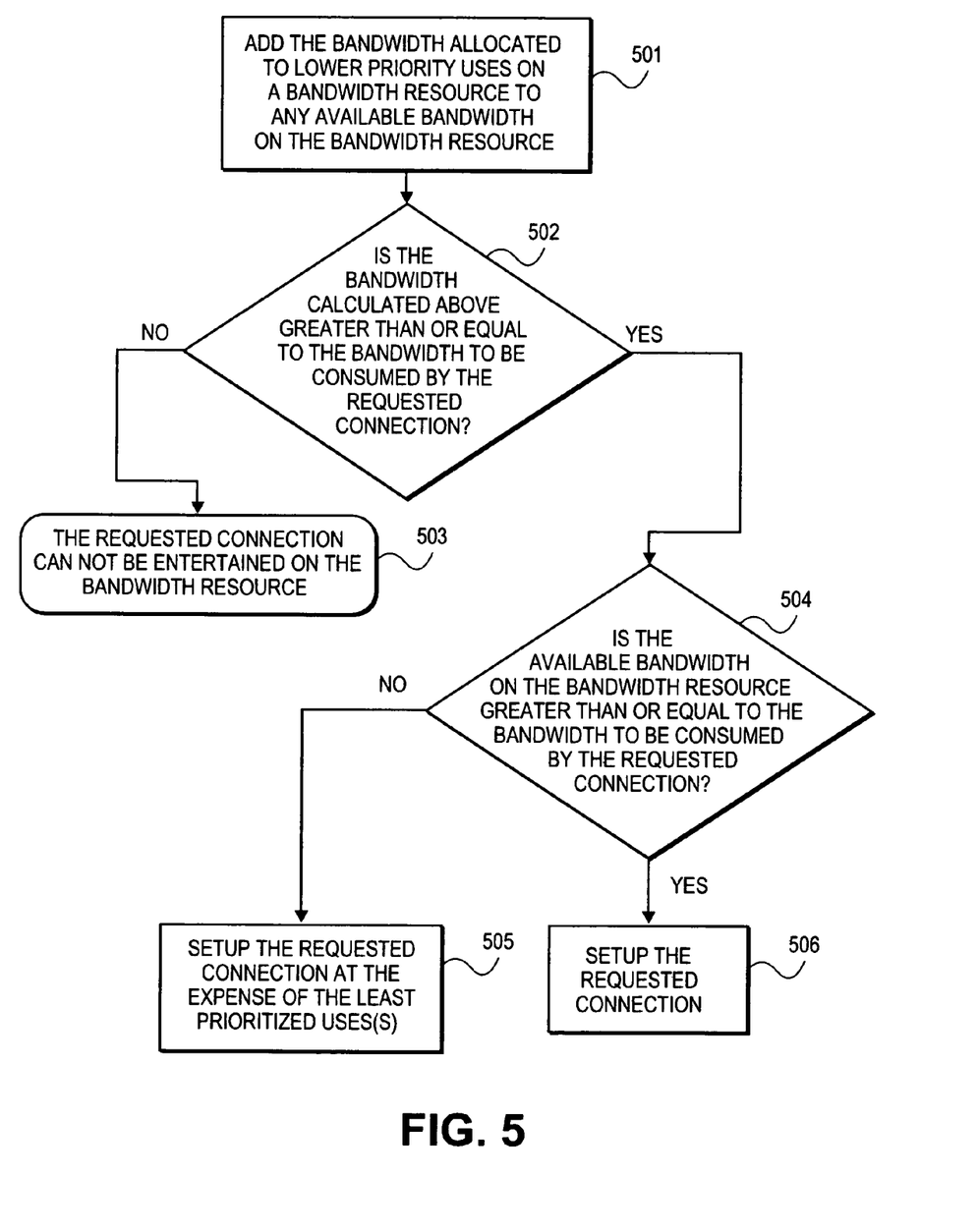
FIG. 5 shows an embodiment of a methodology that may be used to help determine a path through an ATM PNNI network at a source endpoint in light of information that pertains to bandwidth resource allocation elsewhere in the network.

FIG. 5 shows an embodiment of the methodology described above that can be used to determine if a particular bandwidth resource can support a requested connection. Firstly, any freely available bandwidth is added 501 to the bandwidth that has been allocated to lower priority connection(s) in order to determine the amount of bandwidth that may be consumed by a newly requested connection. If this bandwidth available to the newly requested connection is not greater than or equal to the bandwidth to be consumed by the requested connection the connection cannot be entertained 503 at the bandwidth resource being analyzed.

If the bandwidth available for the newly requested connection is greater than the bandwidth to be consumed by the newly requested connection, the requested connection may be entertained at the bandwidth resource being analyzed. Furthermore, if the freely available bandwidth is greater than or equal to the bandwidth to be consumed by the requested connection, then the connection may be established 506 without any priority bumping.

If, however, the freely available bandwidth is not greater than or equal to the bandwidth to be consumed by the requested connection, the connection is established 506 with priority bumping (e.g., at the expense of the lowest priority connection(s)). When a connection is being established, the source endpoint node issues a SETUP message that traverses the network to the destination endpoint node. In an embodiment, the SETUP message is configured to include the priority level and the bandwidth of the connection being established so that the nodes that carry the new connection can determine which connections are to be dropped.

Referring back to FIG. 2, recall that SIG information is broadcast by each node in the network so that a prospective source endpoint node can receive 501 the SIG information and develop an understanding 502 of the network's bandwidth allocations. As part of the PNNI scheme, each node within the network is typically designed to "broadcast" other information (i.e., other than SIG information) that pertains to its understanding of itself and/or the network in which it resides. These broadcasts may occur at specific time intervals and/or upon the occurrence of certain special events.

For example, referring to FIG. 1, if a node $102_5$ observes that networking link $103_{10}$ is not working, the node $102_5$ will broadcast this event to its neighboring nodes $102_2$, $102_7$. Upon the reception of this information, the neighboring nodes $102_2$, $102_7$ will "update" their internal understandings of the network (to reflect this event) as well as rebroadcast this event to their neighboring nodes so that they may update their internal understandings as well. The information is continually rebroadcast as appropriate so that the affected nodes can update their understandings of the network and behave accordingly.

Thus, in a sense, the occurrence of the event ripples through the network so that its constituent nodes can cohesively route information around the downed link $103_{10}$ in response. In other cases, typically, the network's nodes $102_1$ through $102_7$ are also configured to broadcast current status information as well as special events. Thus, on a broader scale, the nodes of the network may be said to communicate procedural (e.g., "control") information with one another as well as the substantive information associated with user traffic.

This control information is often organized into one or more PNNI Topology State Elements (hereinafter, referred to as PTSEs) that are embedded into a PNNI Topology State Packet (hereinafter, referred to as a PTSP). A PTSP is a packet that acts as the broadcast mechanism while a PTSE acts as a component of the PTSP's payload. Thus, for example, if a node has information to broadcast it issues a PTSP that carries one or more PTSEs that each have the information to be communicated. An embodiment 600 of a PTSP is shown in FIG. 6 and an embodiment 701 of a PTSE is shown in FIG. 7.

Figure 6:
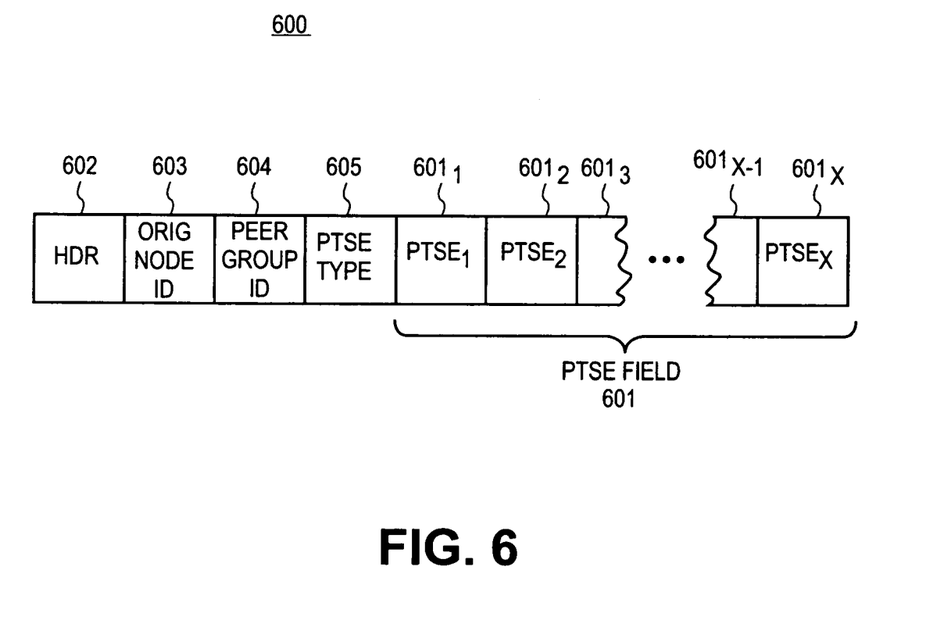
FIG. 6 shows an embodiment of a PNNI Topology State Packet (PTSP).
Figure 7:
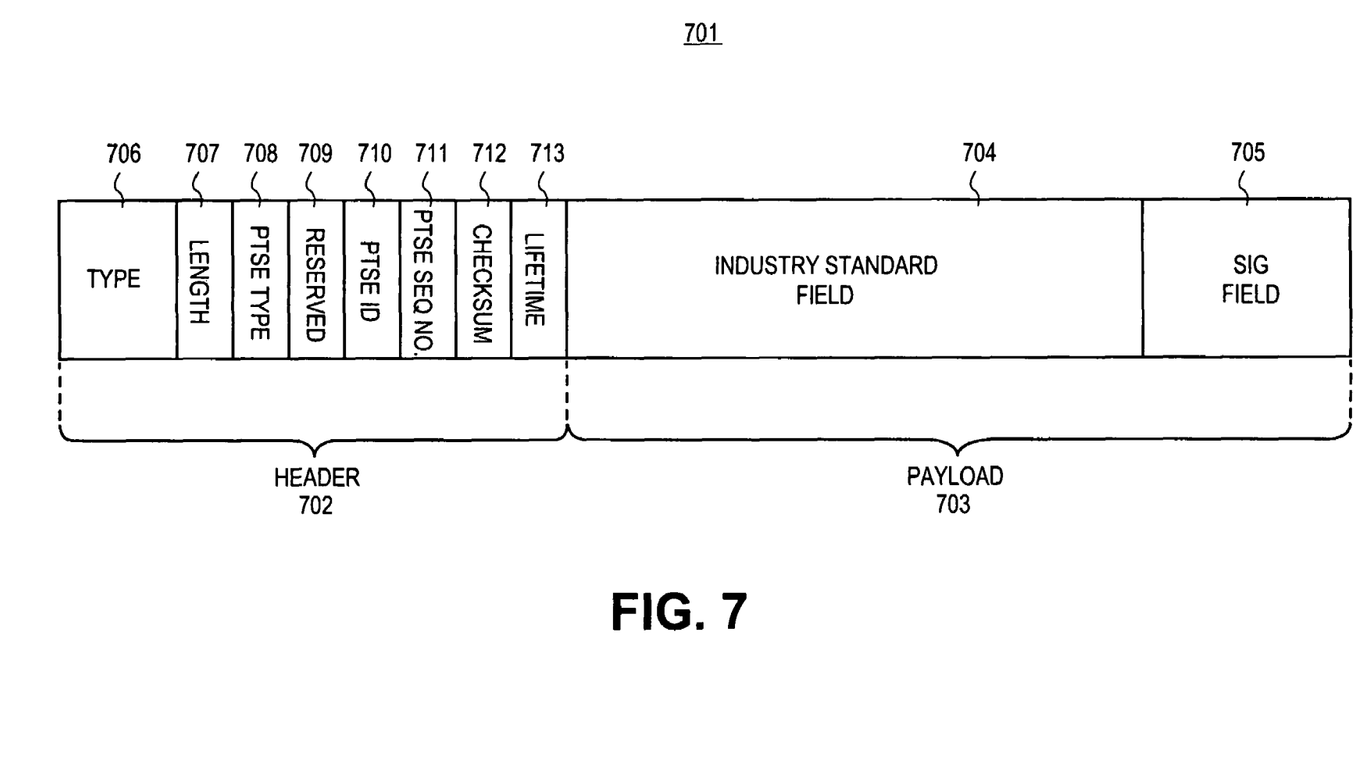
FIG. 7 shows an embodiment of a PNNI Topology State Element (PTSE) that may be embedded within the PTSP of FIG. 6.

Referring to FIG. 6, a PTSP may be viewed as having a header field 606 and a PTSE field 601. The header field 606 has various header information (e.g., checksum info, lifetime, etc.) as well as the identification of the node that is issuing the PTSP (which is located within the originating node ID field 603), the peer group within which the originating node resides (which is located within the Peer Group ID field 604). PNNI Peer groups are discussed in more detail toward the end of this description.

The PTSE field 601 includes one or more PTSEs $601_1$ through $601_x$. An embodiment 701 of a PTSE is shown in FIG. 7. That is, for example, the PTSE embodiment 701 of FIG. 7 may be viewed as corresponding to the PTSE $601_1$ of FIG. 6. Referring to FIG. 7, note that a PTSE may also be viewed as having a header field 702 and a payload field 603. The header field 702 includes various header information such as a type field 706 that identifies the data structure 701 as a PTSE, a length field 707 that identifies the length of the PTSE, a reserved field 709 for potential future uses and a checksum field 712.

The PTSE header field 702 also includes a identifier field 710 that identifies the type of PSTE that PTSE 701 corresponds to. That is, PNNI employs a characterization scheme so that specific types of information can be binned together or recognized within a common PTSE format. The various PTSE types include (among possible others): 1) Horizontal Link; 2) Uplink; 3) External Address; 4) Internal Address; 5) Nodal Parameters (complex node); and 6) Nodal. Those of ordinary skill can identify the purpose and/or use of each PTSE type.

Referring to the PTSE embodiment 701 of FIG. 7, note that the payload field 703 may be viewed as being partitioned into an "industry standard" field 704 and the aforementioned System Capabilities Information Group (SIG) field 705. The industry standard field 704 is used to carry specific information according to a specific format that has been articulated by the PNNI standard. The SIG field 305, by contrast, is used for developers of PNNI compliant networking gear that seek to include special features beyond those recognized or articulated by the PNNI standard.

Through the use of the SIG field 705, two nodes from the same manufacturer can communicate information with one other that is not specifically provided for by the PNNI standard; while, at the same time, operate in compliance with the PNNI standard. That is, those nodes that can understand and use the contents of the SIG field 705 may do so while those that do not understand the SIG field 705 contents may simply ignore its information (as well as forward the PTSE having the SIG field to another node via a rebroadcast effort).

The Horizontal Link PTSE type is commonly used to transport information that pertains to a link, or a portion of a link. That is, finer granularities than the whole of a link's resources may be specified or described with a Horizontal Link PTSE. These finer granularities may be used to develop a deeper understanding of the network's bandwidth allocations. For example, the industry standard field 704 of a Horizontal Link PTSE can specify a particular type of service such as a Constant Bit Rate (CBR) service, a real time or non-real time Variable Bit Rate (VBR) service, an Available Bit Rate (ABR) service and an Unspecified Bit Rate (UBR) service.

As such, the priority levels of a particular link may be further specified so as to define specific priority levels for each of the service types that exist on the link. As such, the network can be configured to bump lower priority connections of a specific type in response to a request for a connection of the same service type. Further still, the industry standard field 704 of a Horizontal Link PTSE can specify particular QoS parameters (e.g., average cell rate, max cell rate, cell transfer delay, cell delay variation, and cell loss ratio).

As such, the priority levels of a particular link may be further specified so as to define specific priority levels not only for each service type, but also for each common combination of QoS parameters that exist on the link. Thus, in various embodiments, the industry standard field 704 of a Horizontal Link PTSE is used to specify the service type or the service type and specific QoS settings for which the bandwidth allocations are detailed according to different priority levels. In various embodiments, the bandwidth allocations for the various priority levels of each of these finer granularities of a link may be specified within the SIG field 705.

Figure 8:
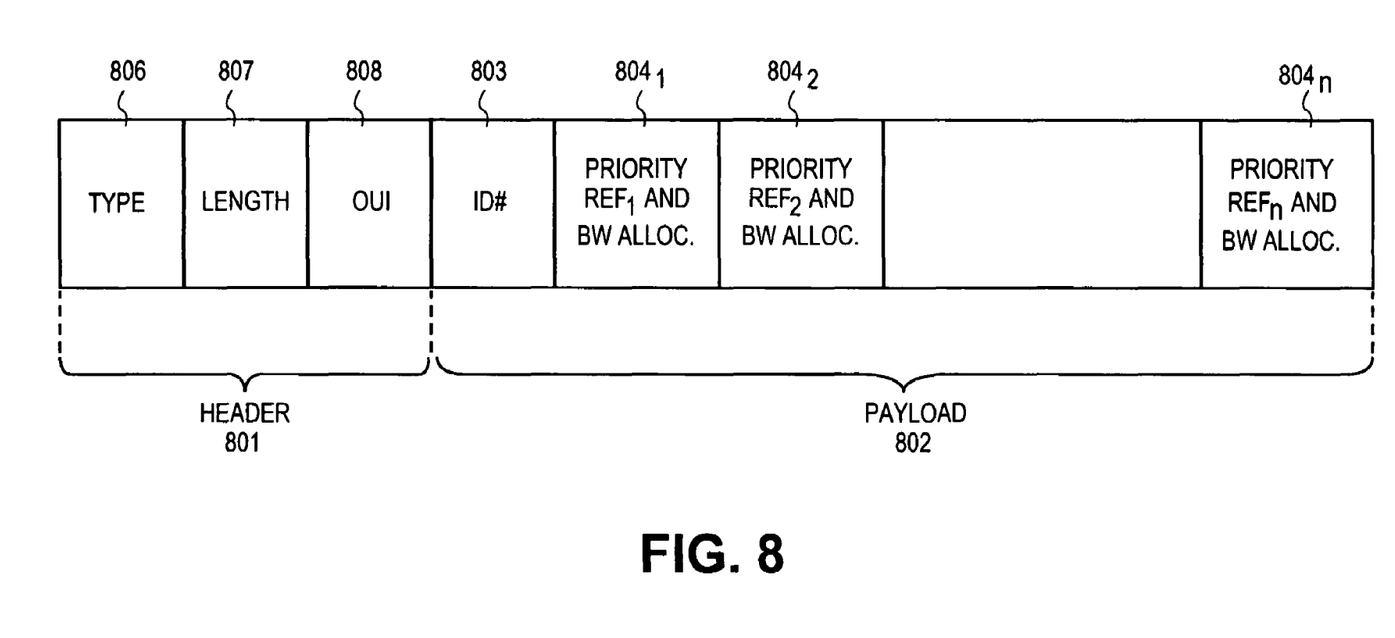
FIG. 8 shows an embodiment of a System Capabilities Information Group (SIG) field that may be embedded within the PTSE of FIG. 6.

FIG. 8 shows an embodiment 805 of a SIG field. That is, the SIG field 805 of FIG. 8 may be viewed as an embodiment of the SIG field 705 of FIG. 7 that can be used to express the address change of an SPVC endpoint. The SIG field embodiment 805 of FIG. 8 can also be viewed as having a header field component 801 and a payload field component 802.

The header field component 801 includes various header information such as a type field 806 (that indicates the data structure 805 is a SIG field), a length field 807 that describes its length and an Organization Unique Identifier (OUI) field 808 that is typically used to recognize the manufacturer of the node that issued the SIG information (i.e., is a "vendor-specific" label). As a SIG field is typically used by the nodes of a common manufacturer to support functional improvements (beyond the PNNI standard) that are unique to the products of the manufacturer, the OUI field 808 is often used by a node to decide whether or not to ignore a received SIG field. That is, if the vendor specific label of the OUI field 808 "matches" the vendor of the node that receives the SIG information, the SIG information will be "looked into"; otherwise, the SIG information will be discarded.

Within the payload 802 of the SIG field 805, the ID # field 803 identifies the particular type of information being delivered by the SIG 805. This allows a node that supports vendor-specific functionality to understand the specific type of information enclosed in the payload 802. As such, in an embodiment, a specific binary number is used to identify that the SIG field 805 includes information related to the priority levels of the particular service type (and perhaps QoS parameter combination) that are specified in the industry standard portion of the PTSE that carries the SIG field 805. In the particular embodiment of FIG. 8, the bandwidth allocations made to each priority level are specified in the priority reference and bandwidth allocation fields $804_1$ through $804_n$.

The rate at which PTSE information (having priority level bandwidth distributions embedded within its SIG field) is broadcast from a particular node may vary from embodiment to embodiment. For example, in one embodiment, PTSE information may be broadcast for each new connection that reflects a change in the distribution of bandwidth resources to the various priority levels. In various networking environments, however, issuing new PTSE information from each node that undergoes a mere change in distribution may congest the network with PTSP packets; or, may make an already congested network even further congested.

As a network gets congested, the delay experienced by its cells increases. Thus, the network understandings that are developed by the network's endpoint nodes may become in danger of being unacceptably inaccurate. That is, the SIG information embedded within the most recently received PTSP packets (which have experienced significant delay) is stale with respect to the actual state of the bandwidth resources they are describing.

As such, in alternate embodiments, the conditions that trigger the release of PTSE information having priority related SIG information may be scaled back. For example, rather than release PTSE information with each change in the distribution of bandwidth resources, in an alternate embodiment PTSE information is released with each "significant" change in the distribution of bandwidth resources. As just one approach, if any priority level experiences a looked-for percentage change (within a finite time period) of allocated bandwidth in either direction (e.g., a 50% increase in bandwidth resources or a 50% decrease in bandwidth resources), PTSE information reflecting the change is broadcast.

In this case, the degree of "significance" is defined by the looked for percentage. As such, other embodiments can configure other degrees of significance such as 25%, 33%, or 66% to name just a few. Note that the degree of significance can adapt to network conditions. For example, under light congestion conditions, the network can reliably handle more PTSP packets. As such, the degree of significance may be lowered (e.g., from X % to Y % where X>Y) so that more PTSE information is issued per unit time (which increases the accuracy of the network understandings made at the endpoint nodes). As network congestion increases, the degree of significance may be increased (e.g., from Y % to X %, where X>Y) so that the PTSE information does not significantly add to the network's congestion.

In other embodiments, rather than trigger the release of PTSE information having priority related SIG information only on an event (such as a change in bandwidth allocation or a significant change in bandwidth allocation), it may alternatively (or in combination) be released periodically. Again, the rate at which the PTSE information is released may vary with network congestion levels. For example, by issuing PTSE information less frequently as congestion rises; or, more frequently as congestion falls.

Note that, to the extent that the understandings of the network that are being maintained by the endpoint nodes become inaccurate, the "crankback" mechanism associated with PNNI signaling may be employed to recover from such an inaccuracy. Specifically, an inaccurate network understanding may result in the release of a SETUP message from a source endpoint node for a connection path that cannot be entertained because higher priority connections have already been established between the time the source endpoint node's latest PTSE information was issued and the time the connection request was received.

Upon the receipt of such a SETUP message by a node that is intended to carry the new connection yet cannot support it (because its bandwidth resources are already consumed by higher or equal priority level connections), the node may return a "crankback" message back to the source endpoint node that issued the SETUP message. The crankback message can be configured to contain information that effectively explains the problem to the source endpoint node. In response, the source endpoint node can update its network understanding and re-determine another path through the network.

As routing and signaling protocols are often implemented with software, it is to be understood that embodiments of this invention may be used as or to support a software program executed upon some form of processing core (such as the CPU of a computer) or otherwise implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Furthermore, it is noteworthy to point out that a network node (which may also be referred to as a networking node, a node, a networking system and the like) is a system designed to act as a switch or a router or other device that relays information from a first networking line to a second networking line. A depiction of a networking node 900 is observed in FIG. 9. A plurality of networking lines $901_1$ through $901_6$ (e.g., copper cables or fiber optic cables) are shown in FIG. 9 as being coupled to the networking node 900.

The node 900 is mostly responsible for collecting a traffic unit (e.g., a packet, a cell or a Time Division Multiplexed (TDM) time slot) from a first networking line (e.g., networking line $901_1$) and re-transmitting at least a portion of it (e.g., its payload and various sections of its header) onto a second networking line (e.g., networking line $901_6$). As such, the node 900 effectively relays information so that it may be carried over various geographic distances. Some degree of intelligence is involved in the relaying process so that the traffic units being collected are forwarded onto an appropriate networking line (e.g., in light of their source address and destination address).

Figure 9:
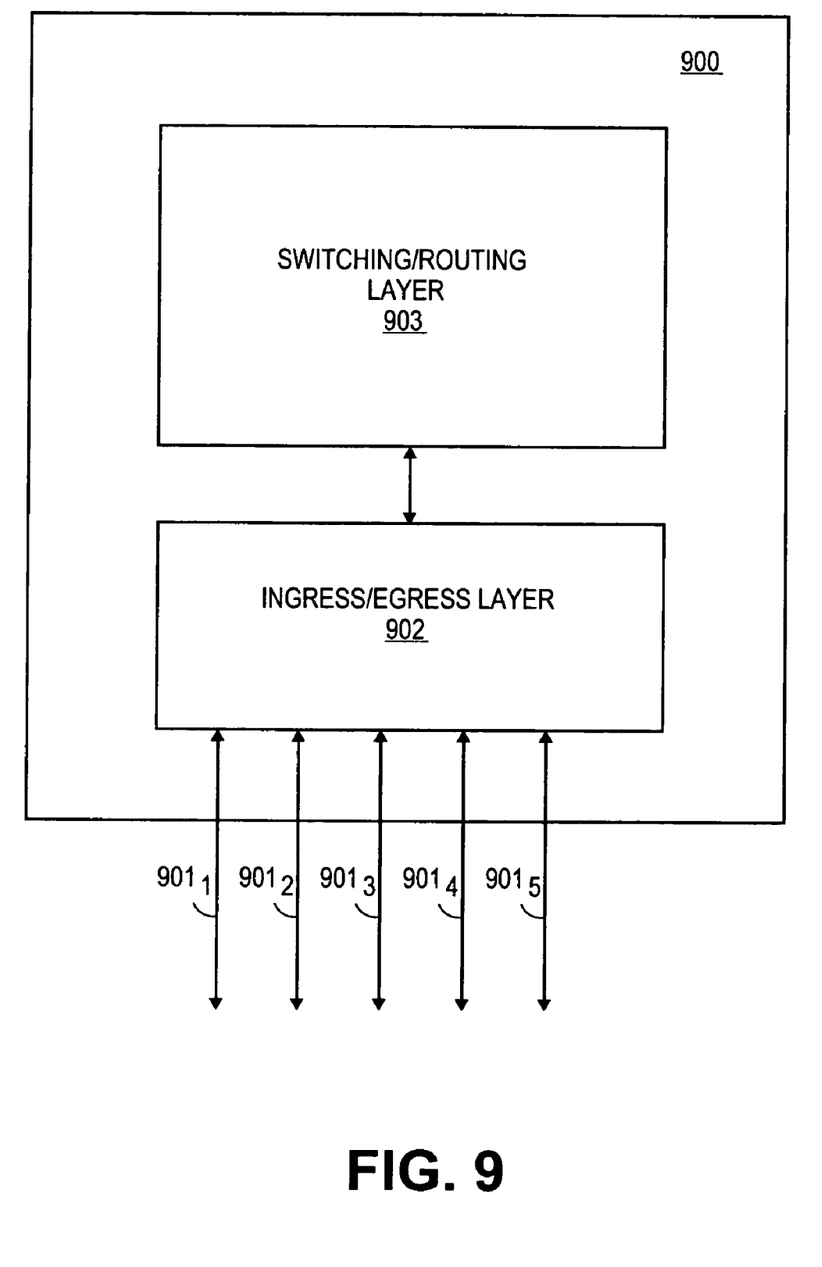
FIG. 9 shows an embodiment of a node.

As such, the node 900 of FIG. 9 shows an traffic ingress/egress layer 902 and a switching/routing layer 903. The ingress/egress layer 902 is responsible for collecting inbound traffic units from the networking lines upon which they arrived; and, presenting at least a portion of them (e.g., their header information) to the switching/routing layer 903. The ingress/egress layer 902 is also responsible for transmitting outgoing traffic units onto a networking line in response to the direction or control of the switching/routing layer 903.

The switching/routing layer 903 is responsible for effectively deciding which networking line is an appropriate networking line upon which a particular traffic unit should be transmitted upon. The switching/routing layer 903 often performs this activity based upon header information or other control information (such as SS7 based TDM connection information) associated with each traffic unit. Connection establishment and tear-down procedures (as well as network topology broadcasts or other networking overhead information) can often be viewed as being integrated into (or coupled to so as to communicate with) the switching/routing layer 903.

Note that the architecture of a networking system having a routing/switching layer 903 and an ingress/egress layer 902 may vary from embodiment to embodiment. For example, in some cases the switching/routing layer 903 may be designed onto a single card; or, in other cases, the switching/routing layer 903 may be designed across a plurality of cards. Also, in some cases the switching/routing layer 903 (or a portion thereof) may be integrated onto a Line Interface Card (LIC) that also acts as part of the ingress/egress layer 902.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:
   a) updating an understanding of an ATM PNNI network after reception of PTSE information, said PTSE information including a first field bundled with a System Capabilities Information Group (SIG) field, the first field describing a bit rate service category of a link in the network, the SIG field describing bandwidth allocations made to specific priority levels of the bit rate service category of the link;
   b) determining a path through said network for a requested connection, said path determined in light of said updated understanding, said requested connection having a priority level, wherein said determined path results in one or more connections being dropped in order to allow bandwidth for said requested connection, each of said dropped connections having a lower priority level than said priority level of said requested connection.

2. The method of claim 1 wherein said PTSE information is a Horizontal Link PTSE information type.

3. The method of claim 1 wherein the first field of the PTSE information further includes one or more QoS parameters for the bit rate service category of the link.

4. The method of claim 3 wherein said PTSE information is a Horizontal Link PTSE information type.

5. The method of claim 4 wherein the bit rate service category in said PTSE information describes a CBR service and said requested connection can be established within said CBR service.

6. The method of claim 4 wherein the bit rate service category in said PTSE information describes a VBR service and said requested connection can be established within said VBR service.

7. The method of claim 4 wherein the bit rate service category in said PTSE information describes an ABR service and said requested connection can be established within said ABR service.

8. The method of claim 4 wherein the bit rate service category in said PTSE information describes a UBR service and said requested connection can be established within said UBR service.

9. The method of claim 4 further comprising issuing a SETUP message in order to establish said path through said network for said requested connection.

10. The method of claim 4 further comprising receiving said SETUP message and returning a CONNECT message in response.

11. A machine readable medium having stored thereon sequences of instructions, which, when executed by a digital processing system cause said digital processing system to:
    a) update an understanding of an ATM PNNI network after reception of PTSE information, said PTSE information including a first field bundled with a System Capabilities Information Group (SIG) field, the first field describing a bit rate service category of a link in the network, the SIG field describing bandwidth allocations made to specific priority levels of the bit rate service category of the link;
    b) determine a path through said network for a requested connection, said path determined in light of said updated understanding, said requested connection having a priority level, wherein said determined path results in one or more connections being dropped in order to allow bandwidth for said requested connection, each of said dropped connections having a lower priority level than said priority level of said requested connection.

12. The machine readable medium of claim 11 wherein said PTSE information is a Horizontal Link PTSE information type.

13. The machine readable medium of claim 11 wherein the first field of the PTSE information further includes one or more QoS parameters for the bit rate service category of the link.

14. The machine readable medium of claim 13 wherein said PTSE information is a Horizontal Link PTSE information type.

15. The machine readable medium of claim 14 wherein the bit rate service category in said PTSE information describes a CBR service and said requested connection can be established within said CBR service.

16. The machine readable medium of claim 14 wherein the bit rate service category in said PTSE information describes a VBR service and said requested connection can be established within said VBR service.

17. The machine readable medium of claim 14 wherein the bit rate service category in said PTSE information describes an ABR service and said requested connection can be established within said ABR service.

18. The machine readable medium of claim 14 wherein the bit rate service category in said PTSE information describes a UBR service and said requested connection can be established within said UBR service.

19. The machine readable medium of claim 11 further comprising authorizing an issuance of a SETUP message in order to establish said path through said network for said requested connection.

20. A network node to operate as part of a network, comprising:
   means for receiving PTSE information from a plurality of other nodes in the network, the PTSE information including a first field bundled with a System Capabilities Information Group (SIG) field, the first field describing a bit rate service category of a link in the network, the SIG field describing bandwidth allocations made to specific priority levels of the bit rate service category of the link; and
   means for determining a path through the network for a requested connection, using the received PTSE information, the requested connection having a priority level, wherein determining the path results in one or more connections being dropped to allow bandwidth for the requested connection, each of the dropped connections having a lower priority level than that of the requested connection.

21. The network node of claim 20 wherein said PTSE information is a Horizontal Link PTSE information type.

22. The network node of claim 20 wherein the first field of the PTSE information further includes one or more QoS parameters for the bit rate service category of the link.

23. The network node of claim 22 wherein said PTSE information is a Horizontal Link PTSE information type.

24. The network node of claim 23 wherein the bit rate service category in said PTSE information describes a CBR service.

25. The network node of claim 23 wherein the bit rate service category in said PTSE information describes a VBR service.

26. The network node of claim 23 wherein the bit rate service category in said PTSE information describes an ABR service.

27. The network node of claim 23 wherein the bit rate service category in said PTSE information describes a UBR service.

28. A networking node to operate as part of a network, comprising:
   a processing core to execute a software program to enable the networking node to (1) access PTSE information received by the networking node from another node in the network, the PTSE information including a first field bundled with a System Capabilities Information Group (SIG) field, the first field describing a bit rate service category of a link in the network, the SIG field describing bandwidth allocations made to specific priority levels of the bit rate service category of the link, and (2) determine a path through the network for a requested connection, using the received PTSE information, the requested connection having a priority level, wherein determining the path results in one or more connections being dropped to allow bandwidth for the requested connection, each of the dropped connections having a lower priority level than that of the requested connection.

29. The networking node of claim 28 wherein said PTSE information is a Horizontal Link PTSE information type.

30. The networking node of claim 28 wherein the first field of the PTSE information further includes one or more QoS parameters for the bit rate service category of the link.

31. The networking node of claim 30 wherein said PTSE information is a Horizontal Link PTSE information type.

32. The networking node of claim 31 wherein the bit rate service category in said PTSE information describes a CBR service.

33. The networking node of claim 31 wherein the bit rate service category in said PTSE information describes a VBR service.

34. The networking node of claim 31 wherein the bit rate service category in said PTSE information describes a UBR service.

* * * * *